(12) United States Patent
Dial, Jr.

(10) Patent No.: US 8,357,053 B1
(45) Date of Patent: Jan. 22, 2013

(54) METAL STEERING COUPLING SUPPORT DEVICE

(76) Inventor: Johnson Dial, Jr., Lakewood, WA (US)

( * ) Notice: Subject to any disclaimer, the term of this patent is extended or adjusted under 35 U.S.C. 154(b) by 195 days.

(21) Appl. No.: 12/869,044

(22) Filed: Aug. 26, 2010

(51) Int. Cl.
F16D 3/48 (2006.01)

(52) U.S. Cl. .......................................... 464/137; 464/69

(58) Field of Classification Search .............. 464/54–56, 464/69, 86, 93, 98, 137, 138
See application file for complete search history.

(56) References Cited

U.S. PATENT DOCUMENTS

| | | | |
|---|---|---|---|
| 176,707 A * | 4/1876 | Tasker | |
| 1,190,323 A * | 7/1916 | Robert | 464/50 |
| 1,522,980 A * | 1/1925 | Roco et al. | 464/56 X |
| 1,615,138 A * | 1/1927 | Runyon | 464/93 |
| 1,643,017 A * | 9/1927 | Hufferd | 464/138 X |
| 2,753,702 A | 7/1956 | Dunn | |
| 2,913,884 A | 11/1956 | Pfeifer | |
| 2,998,717 A | 9/1961 | Schwenk | |
| 3,861,172 A * | 1/1975 | Symann | 464/93 X |
| D269,111 S | 5/1983 | Logsdon | |
| D278,793 S | 5/1985 | Smith et al. | |
| 4,802,881 A | 2/1989 | Hancock | |
| 6,200,223 B1 * | 3/2001 | Martens | |
| 7,322,890 B2 | 1/2008 | Waller | |
| 7,497,781 B2 * | 3/2009 | Cunningham et al. | 464/86 |
| 2003/0030273 A1 | 2/2003 | Shimizu et al. | |

FOREIGN PATENT DOCUMENTS

GB 1 327 791 * 8/1973

* cited by examiner

Primary Examiner — Gregory Binda

(57) ABSTRACT

A steering coupling support device for use in combination with a standard elastic steering coupling in a vehicle. The device features a generally flat disc having a top surface and a bottom surface. A center aperture is disposed in a center of the disc, and four outer apertures are disposed in the disk outside the center aperture in a symmetrical manner. The steering coupling support device is constructed from a metal.

1 Claim, 3 Drawing Sheets

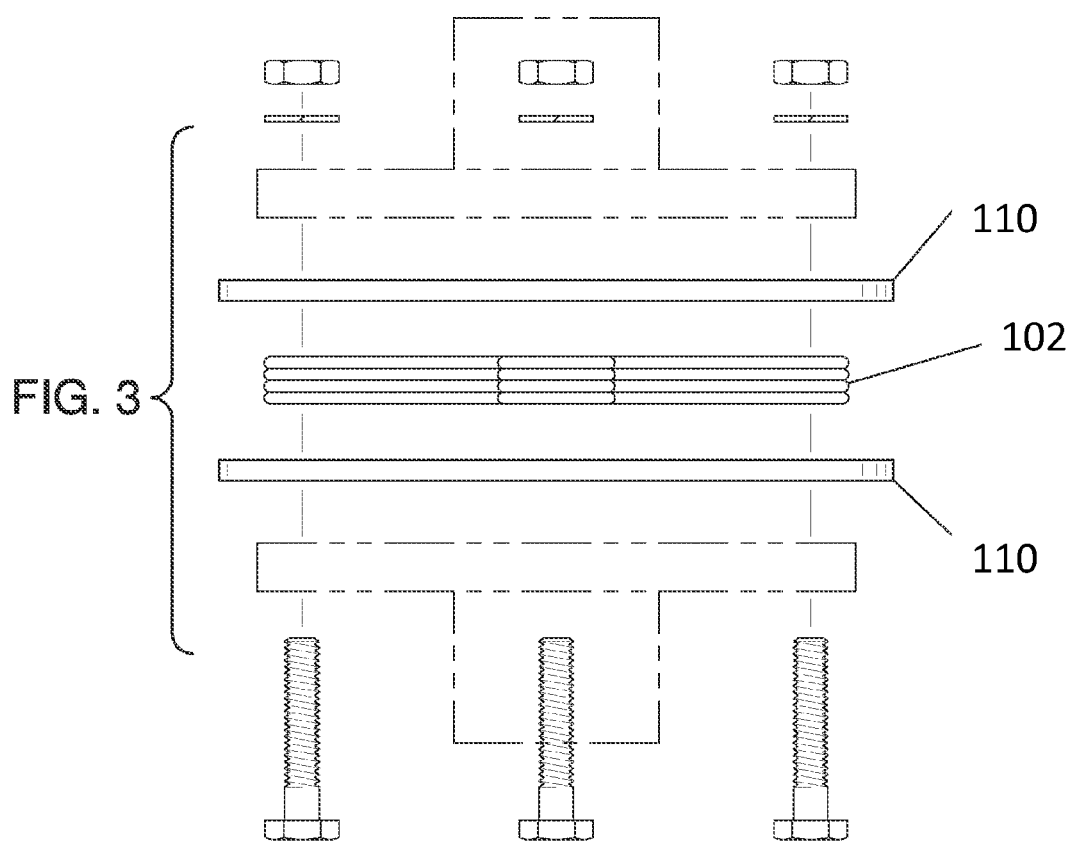

METAL STEERING COUPLING SUPPORT DEVICE

FIELD OF THE INVENTION

The present invention is directed to a metal steering coupling support for use in combination with an elastic steering coupling.

BACKGROUND OF THE INVENTION

When the elastic steering coupling breaks in a vehicle, a fatal accident usually results. The present invention features a metal steering coupling support device for use in combination with the standard elastic steering coupling in a vehicle. The steering coupling support device of the present invention provides strength to the steering gear coupling, helping to ensure that the steering coupling doesn't fail completely. The steering coupling support device is constructed from metal so it is more durable than the elastic counterpart. This can help save time and money by preventing frequent part replacements.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 3 is a side exploded view of FIG. 2.

DESCRIPTION OF PREFERRED EMBODIMENTS

Figure 1:
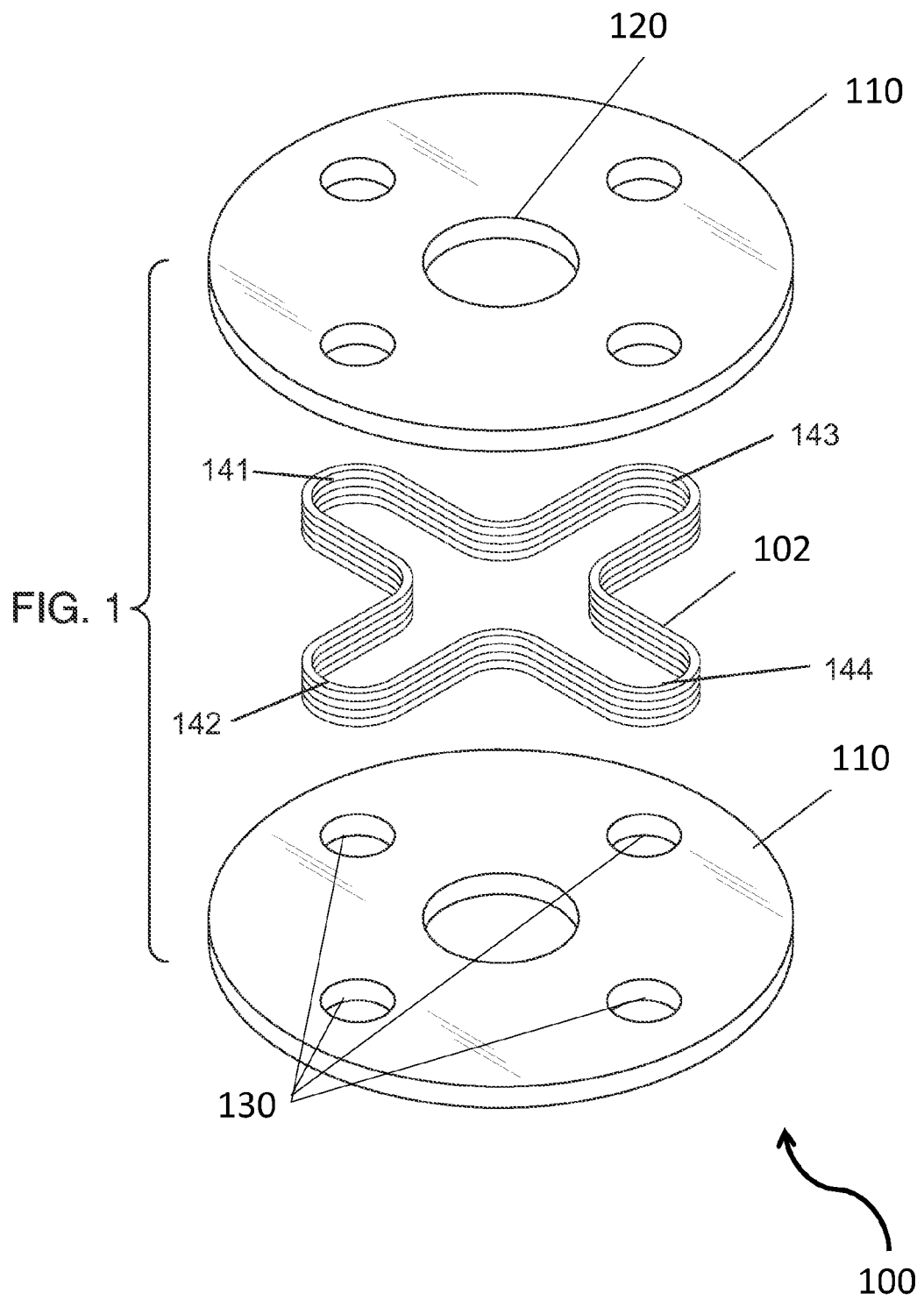
FIG. 1 is a perspective view of two steering coupling support devices 100 sandwiching a plastic shaft coupling 102.
Figure 2:
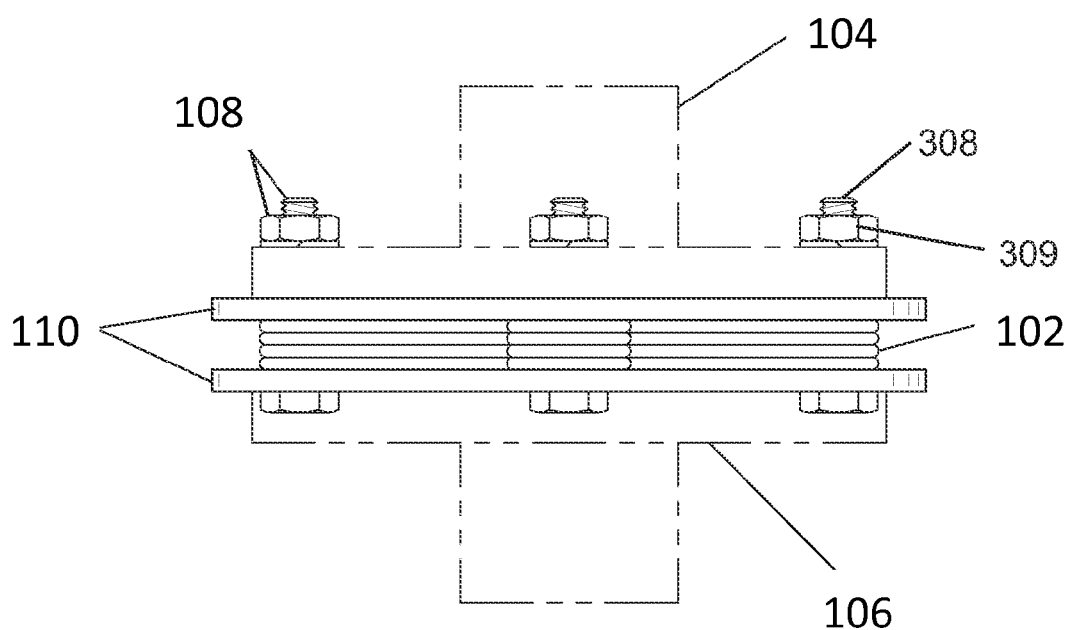
FIG. 2 is a side view of two steering coupling support devices 100 sandwiching a plastic shall coupling 102. The steering coupling support devices 100 and plastic shaft coupling 102 and sandwiched by an upper flange 104 and a lower flange 106 (secured by mounting hardware 108). The coupling 102 is a continuous loop formed in a cross-shape having four arms 141, 142, 143, and 144, wherein the section of each of the four bolts between a first steering coupling support device and a second steering coupling support device resides within each of the said arm of the said plastic coupling.

Referring now to FIG. 1-3, the present invention features a metal steering coupling support device 100 for use in combination with the standard elastic steering coupling in a vehicle. The support device 100 of the present invention comprises a generally flat disc 110 having a top surface and a bottom surface. Disposed in the center of the disc 110 is a center aperture 120. Disposed in the disc surrounding the center aperture in a symmetrical manner are four outer apertures 130. The support device 100 of the present invention resembles standard elastic steering couplings, which are well known to one of ordinary skill in the art. The steering coupling support device 100 can be used in combination of or in lieu of standard elastic steering couplings (see FIG. 2, FIG. 3).

The present invention also features a system comprising a first steering coupling support device and a second steering coupling support device. Each steering coupling support device comprises a generally flat disc having a top surface and a bottom surface, a center aperture disposed in a center of the disc, and four outer apertures disposed in the disk outside the center aperture in a symmetrical manner. Each steering coupling support device is constructed from a metal.

The system further comprises a plastic shaft coupling sandwiched between the first steering coupling device and the second steering coupling support device, and an upper flange and a lower flange. The first steering coupling support device, the second steering coupling support device, and the plastic shaft coupling device are together sandwiched between the upper flange and the lower flange (see FIG. 2). The system may be secured together with mounting hardware 108, such as bolt 308 and nut 309.

The disclosures of the following U.S. Patents are incorporated in their entirety by reference herein: U.S. Pat. Application No. 2003/0030273; U.S. Pat. No. 4,802,881; U.S. Pat. No. 2,913,884; U.S. Pat. No. 2,753,702; U.S. Pat. No. 7,322,890; U.S. Pat. No. 2,998,717; U.S. Design Pat. No. D278,793; U.S. Design Pat. No. D269,111.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A system consisting of:
   (a) a first steering coupling support device and a second steering coupling support device, each steering coupling support device comprising a generally flat disc having a top surface and a bottom surface; a center aperture disposed in a center of the disc; four outer apertures disposed in the disk outside the center aperture in a symmetrical manner, wherein each steering coupling support device is constructed from a metal;
   (b) four bolts securing both coupling device together via the said outer apertures, wherein the said bolts are tightened by nuts;
   (c) a plastic shaft coupling sandwiched between said first steering coupling device and said second steering coupling support device; wherein the coupling is a continuous loop formed in a cross-shape having four arms, wherein the section of each of the four bolts between said first steering coupling support device and said second steering coupling support device resides within each of the said arm of the said plastic coupling; and
   (d) an upper flange and a lower flange, the first steering coupling support device, the second steering coupling support device, and the plastic shaft coupling device are together sandwiched between the upper flange and the lower flange.

* * * * *